United States Patent
Cardoso

(10) Patent No.: US 10,744,901 B2
(45) Date of Patent: Aug. 18, 2020

(54) COOLING SYSTEM HAVING ACTIVE CABIN VENTING FOR A VEHICLE BATTERY

(75) Inventor: Jesus Cardoso, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 945 days.

(21) Appl. No.: 13/495,841

(22) Filed: Jun. 13, 2012

(65) Prior Publication Data

US 2013/0337296 A1 Dec. 19, 2013

(51) Int. Cl.

| | |
|---|---|
| *H01M 10/52* | (2006.01) |
| *B60L 58/26* | (2019.01) |
| *H01M 2/12* | (2006.01) |
| *B60H 1/00* | (2006.01) |
| *H01M 10/663* | (2014.01) |

(Continued)

(52) U.S. Cl.
CPC ............ *B60L 58/26* (2019.02); *B60H 1/00278* (2013.01); *B60L 1/003* (2013.01); *B60L 1/02* (2013.01); *B60L 3/0046* (2013.01); *B60L 58/12* (2019.02); *H01M 2/12* (2013.01); *H01M 10/613* (2015.04); *H01M 10/625* (2015.04); *H01M 10/6563* (2015.04); *H01M 10/663* (2015.04); *B60K 2001/003* (2013.01); *B60K 2001/005* (2013.01); *B60L 2240/34* (2013.01); *B60L 2240/545* (2013.01); *B60L 2250/16* (2013.01); *H01M 2220/20* (2013.01); *Y02T 10/705* (2013.01); *Y02T 10/7005* (2013.01); *Y02T 10/7044* (2013.01)

(58) Field of Classification Search
CPC .......... B60H 1/00278; B60H 2001/003; B60K 2001/005; H01M 10/5004; H01M 10/5016; H01M 10/5067; H01M 10/5095; H01M 2220/20; H01M 2/12; H01M 10/613; H01M 10/625; H01M 10/6563; H01M 10/663; B60L 11/1861; B60L 11/1874; B60L 1/003; B60L 1/02; B60L 2240/34; B60L 2240/545; B60L 2250/16; B60L 3/0046; B60L 58/12; B60L 58/26; Y02T 10/7005; Y02T 10/7044; Y02T 10/705

USPC .................... 429/72, 61, 64, 71, 82

See application file for complete search history.

(56) References Cited

U.S. PATENT DOCUMENTS

| | | | | |
|---|---|---|---|---|
| 5,937,664 A | * | 8/1999 | Matsuno et al. | 62/259.2 |
| 6,025,086 A | * | 2/2000 | Ching | 429/82 |

(Continued)

FOREIGN PATENT DOCUMENTS

| | | |
|---|---|---|
| CN | 1638185 A | 7/2005 |
| CN | 200974474 Y | 11/2007 |

(Continued)

OTHER PUBLICATIONS

Chinese Office Action related to corresponding file No. CN 201310233425.2; dated Jul. 21, 2016; 7 pages.

*Primary Examiner* — Lingwen R Zeng

(74) *Attorney, Agent, or Firm* — David Kelley; Brooks Kushman P.C.

(57) ABSTRACT

A vehicle traction battery cooling system is provided. The battery cooling system includes a blend door movable between at least an open and a closed position to select the location of incoming air for cooling a plurality of battery cells. A controller is configured to command the door to the open position in response to detecting gases vented by the battery cells.

6 Claims, 2 Drawing Sheets

(51) Int. Cl.
| | |
|---|---|
| *H01M 10/6563* | (2014.01) |
| *H01M 10/625* | (2014.01) |
| *H01M 10/613* | (2014.01) |
| *B60L 1/00* | (2006.01) |
| *B60L 3/00* | (2019.01) |
| *B60L 1/02* | (2006.01) |
| *B60L 58/12* | (2019.01) |
| *B60K 1/00* | (2006.01) |

(56) References Cited

U.S. PATENT DOCUMENTS

| | | | |
|---|---|---|---|
| 6,377,880 B1 * | 4/2002 | Kato et al. | 701/32.9 |
| 7,045,236 B1 * | 5/2006 | Andrew et al. | 429/83 |
| 7,399,551 B2 | 7/2008 | Yagi et al. | |
| 7,733,065 B2 | 6/2010 | Yoon et al. | |
| 7,845,187 B2 * | 12/2010 | Patel et al. | 62/259.2 |
| 7,951,477 B2 | 5/2011 | Wood et al. | |
| 8,047,318 B2 * | 11/2011 | Zhu et al. | 180/68.2 |
| 2003/0080714 A1 | 5/2003 | Inoue et al. | |
| 2005/0285563 A1 * | 12/2005 | Yoneda | 320/112 |
| 2006/0033468 A1 * | 2/2006 | Zhu et al. | 320/104 |
| 2007/0087266 A1 | 4/2007 | Bourke et al. | |
| 2008/0236181 A1 | 10/2008 | Zhu et al. | |
| 2009/0081531 A1 | 3/2009 | Yoda | |
| 2009/0111007 A1 | 4/2009 | Naganuma | |
| 2011/0059341 A1 * | 3/2011 | Matsumoto | B60H 1/00278 429/82 |

FOREIGN PATENT DOCUMENTS

| | | |
|---|---|---|
| CN | 101267961 A | 9/2008 |
| CN | 201415608 Y | 3/2010 |

\* cited by examiner

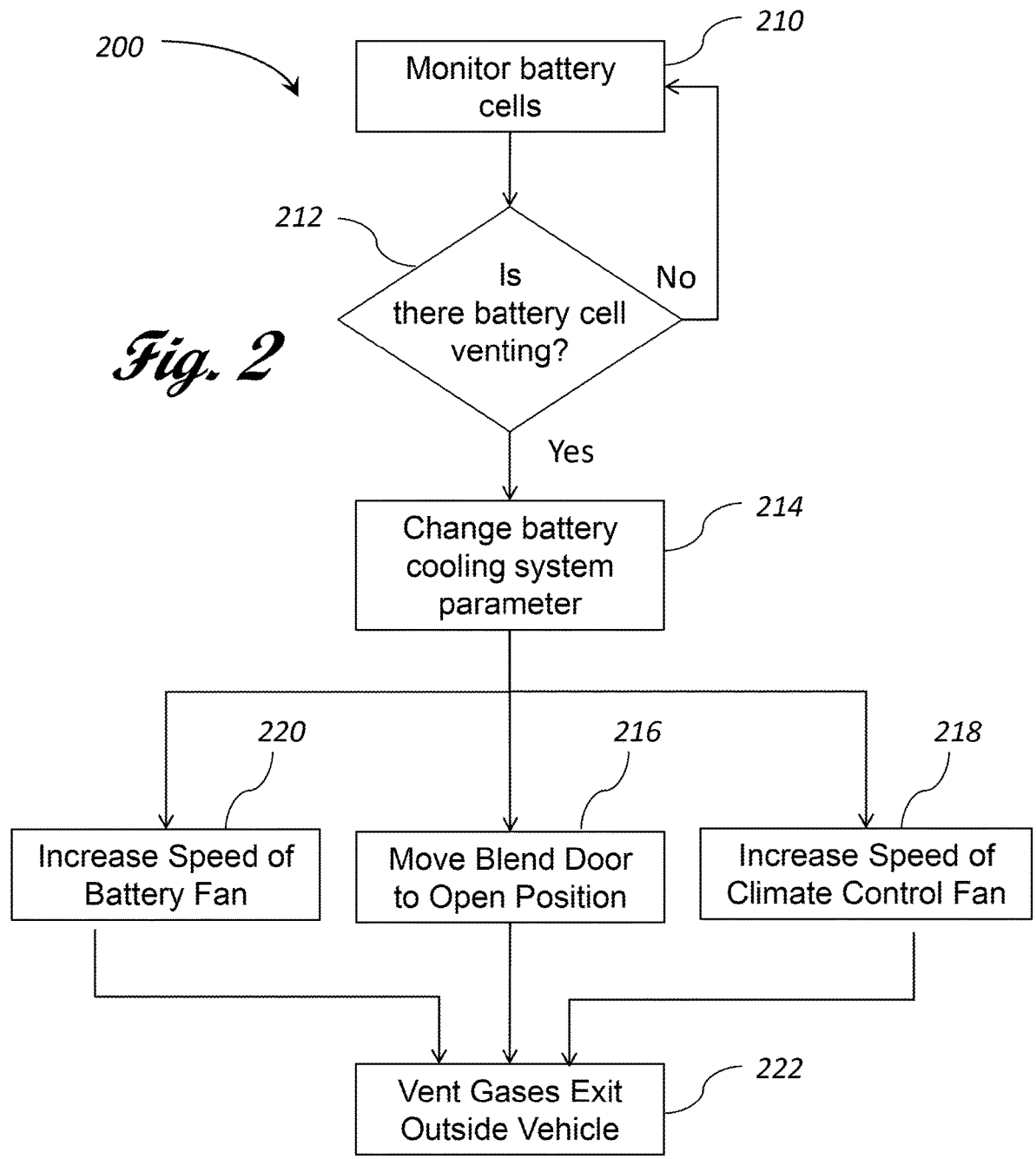

COOLING SYSTEM HAVING ACTIVE CABIN VENTING FOR A VEHICLE BATTERY

TECHNICAL FIELD

This disclosure relates to cooling systems having active cabin venting for vehicle traction batteries.

BACKGROUND

A battery may generate heat during charging and discharging, and may need to be cooled for performance, fuel economy, and battery life reasons. In addition, a battery may vent cell gases which are required to be evacuated from the passenger cabin.

A battery in a hybrid electric vehicle (HEV) or an electric vehicle or any other alternative energy vehicle including a traction battery may be cooled by a separate cooling system for the battery. Other battery cooling systems may use cabin air to cool the battery or a portion of the climate control system to cool the battery.

One example is of a battery cooling system is illustrated in U.S. Pat. No. 8,047,318.

SUMMARY

In one embodiment, a vehicle traction battery cooling system is provided. The battery cooling system includes a blend door movable between at least an open and a closed position to select a source of incoming air for cooling a plurality of battery cells. A controller is configured to command the door to the open position in response to detecting gases vented by the battery cells.

In another embodiment, the source of incoming air is from outside the vehicle when the door is in the open position. The source of incoming air is from a passenger cabin when the door is in the closed position. The source of incoming air is from outside the vehicle and the passenger cabin when the door is in a position between the open and closed positions.

In another embodiment, the battery cooling system includes a fan located downstream of the blend door. The controller is configured to command the fan to increase speed in response to detecting gases vented by the battery cells.

In another embodiment, the battery cooling system includes an air supply duct arranged to direct the incoming air to a battery chamber surrounding the battery cells.

In another embodiment, the battery cooling system includes a vent tube in fluid communication with the battery chamber and extending from the battery chamber to outside the vehicle.

In another embodiment, the battery cooling system includes an air puller fan in fluid communication with the battery cells arranged to pull air from the battery chamber and to direct it away from the battery chamber.

In another embodiment, the controller is configured to command the air puller fan to increase speed in response to detecting gases vented by the battery cells.

In another embodiment, the battery cooling system includes a climate control system in fluid communication with the battery cooling system. The climate control system includes the blend door and a climate control fan. The controller is configured to command the fan to increase speed in response to detecting gases vented by the battery cells.

In one other embodiment, a vehicle control system is provided. The vehicle control system includes a vehicle traction battery and a cooling system in fluid communication with the battery. A controller is configured to command a cooling system parameter to change in response to detecting gases vented by the battery cells.

In one other embodiment, a method for cooling a traction battery in a vehicle is provided. The method includes commanding a cooling system parameter to change in response to detecting gases vented by the battery cells.

BRIEF DESCRIPTION OF THE DRAWINGS

FIG. 2 is a flow chart illustrating a method for cooling a traction battery with a cooling system as shown in FIG. 1.

DETAILED DESCRIPTION

Figure 1:
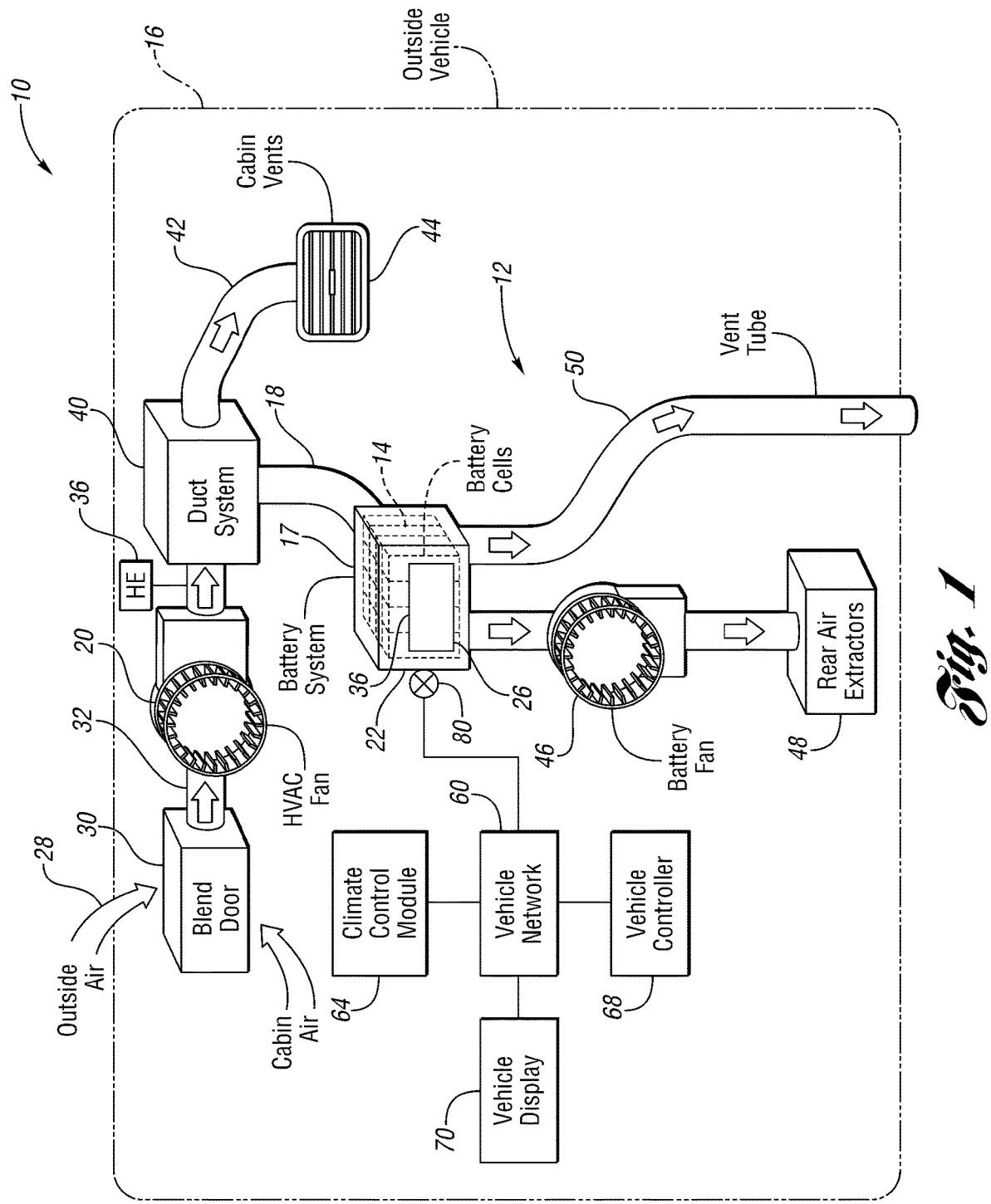
FIG. 1 illustrates a cooling system for a traction battery in a vehicle, according to one embodiment.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a battery cooling system 10 incorporated with a climate control system 12 of a vehicle. The air distribution using the climate control system 12 can be adjusted based on the battery 14 and the passenger cabin 16 needs.

The air to a battery 14 may be directed to the battery system 17 through a dedicated duct 18 or ducts. Either the same fan 20 or a second dedicated air blower may be used for the passenger cabin climate control system 12 and battery cooling system 10.

An advantage of an air cooled battery cooling system 10 can be that the location of the battery 14 within the vehicle is flexible since coolant piping does not have to be routed throughout the vehicle to a battery chamber 22. This is especially beneficial when the battery 14 is located in an extreme rear portion of the vehicle. Instead, air ducts may be used to direct the air to the battery chamber 22. Even if air ducts must be routed to a rear portion of the vehicle to a battery chamber, the vehicle may already include rearward air ducts to cool the rear portion of the cabin. For example, some vehicles include air ducts for the second row seat climate control. These ducts may be extended to the battery system thermal control. Even if the vehicle does not include rear air ducts, air ducts may be less expensive than refrigerant piping.

In some embodiments of the disclosure, the battery 14 may be cooled with cabin 16 air when the climate control system 12 for the cabin 16 is turned off. In this case, more air may be needed since the passenger cabin 16 air temperature may be relatively warm. The cooled air directly from the passenger cabin 16 may require the air flow to the battery 14 to be greater. In this case, a separate door 26 may be needed in the battery system 17. In another embodiment, dedicated ducts from the climate control system 12 to the battery chamber 22 are not required.

The battery 14 can be cooled with outside air 28 when the climate control system 12 is turned off and it is undesirable to use the passenger cabin 16 air. In this case, a blend door 30 door is required to switch the air between the climate control system 12, the passenger cabin 16, and outside air 28.

An entry duct 32 may receive air from outside vehicle 28, cabin air from the vehicle cabin 16, or some combination thereof based on the position of the blend door 30. The entry duct 32 directs this air to the fan 20. The climate control system fan 20 may then direct the air over a heat exchanger 36 to cool the air. The cooled air exits the heat exchanger 36 and enters a duct system 40.

The duct system 40 may direct air into either or both of the battery duct 18 or the cabin ducts 42. The cabin ducts 42 fluidly connect the duct system 40 with cabin air vents 44. The battery duct 18 fluidly connects battery chamber 22 with the duct system 40. Air cooled by heat exchanger 36 may be used to cool one or both of battery 14 and vehicle cabin 16.

A fan 46 located downstream of the battery system 17 pulls air from within battery chamber 22 and directs it into vehicle trunk or rear air extractors 48. In another embodiment, a fan may be a pusher type cooling fan. The pusher type cooling fan pulls in air from the cabin or outside of the vehicle and then pushes cooling air into the battery chamber 22 and eventually to the atmosphere outside the vehicle through rear air extractors 48 or the vent tube 50.

The battery cooling system 10 is in electrical communication with a vehicle communication network 60. The vehicle network 60 may continuously broadcast data and information to the vehicle-based systems, such as a climate control module 64, a vehicle controller 68 or an information display system 70. The vehicle network 60 may be a controlled area network (CAN) bus used to pass data to and from the vehicle systems (or components thereof).

Although the vehicle network 60 is shown with a single vehicle controller 64, the vehicle network 60 may be connected to multiple controllers or control system that may be used to control multiple vehicle systems.

The controller area network (CAN) 60 may allow the controller 64 to communicate with the climate control system 12 and the battery system 17. Just as the climate control system 12 includes a controller 64, the battery system may have its own controller. Some or all of these various controllers can make up a control system. Although illustrated and described in the context of a battery electric vehicle (BEV), it is understood that embodiments of the present application may be implemented on other types of vehicles, such as those powered by an engine in combination with an electric motor.

In addition to the foregoing, the vehicle network 60 may be in communication with an information display system 70. The display system 70 can provide relevant vehicle information to the driver of the vehicle. For example, the information display system 70 can indicate various battery system characteristics, such as state-of-charge or venting status.

The information display system 70 may be disposed within a dashboard of the vehicle, such as in an instrument panel or center console area. The information display system 70 may include a touch screen, buttons for receiving and effectuating driver input associated with selected areas of the information display system 70, such as the climate control system 12 or the battery cooling system 10.

The battery cooling system 10 can also include a sensor 80 or battery monitoring system that monitors the battery conditions and manages temperature and state-of-charge or venting of each of the battery cells, for example.

The sensor 80 may be positioned in the battery chamber 22 or adjacent the battery cells 14 for detecting battery cell venting. Typically, the battery cells 14 do not vent gases.

However, in some circumstances or conditions, the battery cells 14 may be required to vent gases. During battery cell venting, the sensor 80 or battery monitoring system be adapted to detect the vented gases. The sensor 80 may be any suitable sensor for detecting venting gases. Alternatively, an alternate detection mechanism may be used to determine if the battery cells 14 vented gases. In another embodiment, the sensor 80 or battery monitoring system can be configured to detect conditions that would include a likelihood of the battery cells 14 venting gases.

The sensor 80, or any suitable detection mechanism, provides a signal to the vehicle network 60 when/if the battery cell 14 venting occurs, or is likely to occur. In response to the vented gas signal, the battery cooling system 10 commands a change in a cooling system parameter in order to direct the vent gases outside the vehicle, or prevent the vented gases from entering the passenger compartment. This may be particularly important in vehicles where the battery system 17 is located in the passenger cabin 16, as opposed to a separate compartment like the trunk.

A battery cooling system 10 command to change a cooling system parameter may automatically override any driver inputs. Alternatively, the battery cooling system 10 may provide a message on the information display system 70 requesting that the driver change a system parameter manually.

The climate control module 64 may change a cooling system parameter by commanding the blend door 30 to an open position based on the battery cell venting signal. In a fully open position, blend door 30 solely receives fresh air from outside the vehicle 28. In contrast, in a fully closed position, the blend door 30 solely receives cabin air from the passenger cabin 16. In an intermediate open position, the blend door 30 receives a combination of air from outside the vehicle air 28 from inside the passenger cabin 16 air.

The climate control module 64 may also automatically change a cooling system parameter by commanding a cooling fan to increase speed based on the battery cell venting gases input. The climate control module 64 may increase the speed of the climate control fan 20 that is upstream of the battery chamber 22. By increasing the speed of the fan 20, more air is pushed through the duct system 40 and subsequently through the battery system duct 18 and battery chamber 22. Air that is pushed from the battery chamber 22 can then be evacuated to the atmosphere outside 28 the vehicle through the vent tube 50.

Alternatively, the climate control module 64 may increase the speed of the battery fan 46. By increasing the speed of the battery fan 46, more air is pulled from the battery chamber 22 in order to evacuate vented gases to the atmosphere outside 28 the vehicle through the vent tube 50 or the rear air extractors 48.

FIG. 2 illustrates a flow chart 200 depicting a method for cooling a traction battery 14 with a battery cooling system 10 as shown in FIG. 1. As those of ordinary skill in the art will understand, the functions represented by the flowchart may be performed by hardware and/or software. Depending on the particular processing strategy, such as event driven, interrupt driven, etc., the various functions may be performed in an order or sequence other than that illustrated in FIG. 2. Likewise, one or more steps or functions may be repeatedly performed although not explicitly illustrated. Similarly, one or more of the steps or functions illustrated may be omitted in some applications or implementations. In one embodiment, the functions illustrated are primarily implemented by software instructions, code, or control logic stored in a computer-readable storage medium and executed by a microprocessor based computer or controller to control operation of the vehicle, such as the battery cooling system or the climate control controller, illustrated in FIG. 1.

Initially, a controller monitors the battery system in order to detect any battery cell venting, as represented by block 210. As discussed above, the system may include a sensor or another suitable detection mechanism for monitoring for venting gases.

The controller determines if/when battery cell venting occurs based on an input signal, as represented by block 212. If the input signal indicates battery cell venting, the controller provides a signal to the climate control system and battery cooling system to change a system parameter, as represented by block 214.

In response to the change parameter signal from block 214, the controller commands the blend door to open to an open position, as represented by block 216. In an open position, the blend door directs air from outside the vehicle into the climate control system and subsequently into the battery system and passenger cabin. The blend door may move to a fully open position so that the blend door only directs outside air into the cooling system. Alternatively, the blend door may move to an intermediate open position which directs a combination of outside air and cabin air into the cooling system.

In response to the change parameter signal from block 214, the controller can also command a fan to increase speed. The controller may command a climate control fan to increase speed, as represented by block 218. The climate control fan may be a fan in the climate control system which may be located upstream of the battery system. The controller may also command a battery fan to increase speed. The battery fan may be in the battery system which may be located downstream of the battery cells and battery chamber.

In response to the change parameter signal from block 214, the controller can change one or more battery cooling system parameters, climate control system parameters, or any combination thereof. The combined battery cooling system parameters direct the venting gases to outside the vehicle, represented by block 222.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for cooling a traction battery in a vehicle, the method comprising:
   receiving, by a controller, a signal indicative of a presence of gases vented by the battery;
   commanding, by the controller, a cabin climate control system parameter to change in response to the signal.

2. The method of claim 1 wherein commanding the cabin climate control system parameter to change further comprises commanding, by the controller, a blend door to move to an open position to direct air from outside the vehicle into a battery cooling system.

3. The method of claim 2 wherein commanding the cabin climate control system parameter to change further comprises commanding, by the controller, a fan located downstream of the blend door to increase speed to direct air from outside the vehicle into the battery cooling system.

4. The method of claim 1 wherein commanding the cabin climate control system parameter to change comprises commanding, by the controller, a fan in fluid communication with the battery to increase speed, wherein the fan directs air from a battery chamber to outside the vehicle.

5. The method of claim 1, in response to detecting the presence of gases vented by the battery, the method further comprising:
   commanding, by the controller a blend door to move to an open position to direct air from outside the vehicle into a climate control duct system connected to a battery cooling system;
   commanding, by the controller, a climate control fan located downstream of the blend door to increase speed to direct air from outside the vehicle into the battery cooling system; and
   commanding, by the controller, a battery fan located downstream of the battery to increase speed, wherein the fan blows air from a battery chamber outside the vehicle.

6. The method of claim 2 wherein further comprising receiving, by the controller, the signal of a presence of gases vented by the battery from a sensor disposed in a battery chamber.

* * * * *